UNITED STATES PATENT OFFICE.

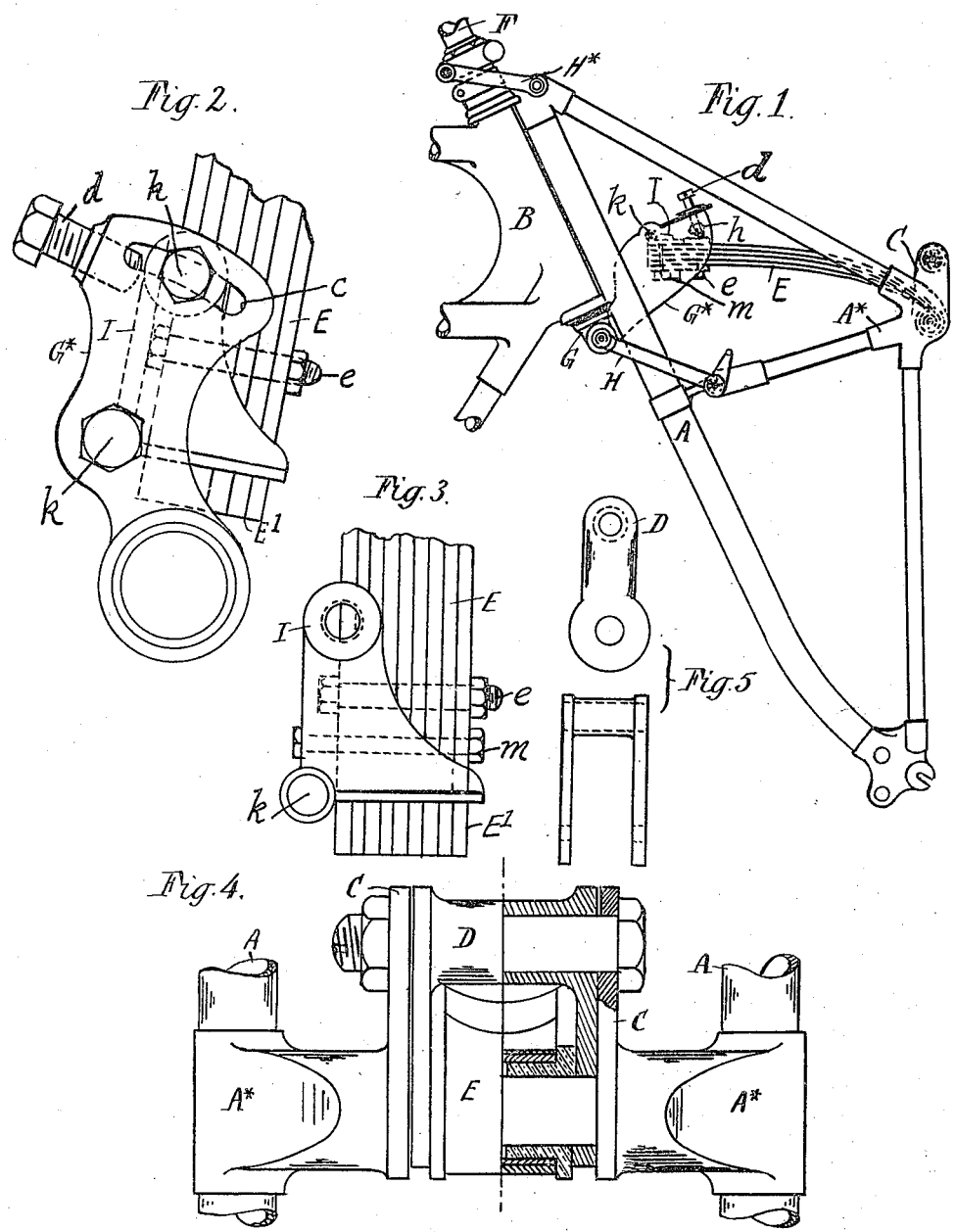

GEORGE EDWIN RIGBY, OF MANCHESTER, ENGLAND.

SPRING-FORK FOR MOTORCYCLES.

1,322,619.          Specification of Letters Patent.      Patented Nov. 25, 1919.

Original application filed June 11, 1918, Serial No. 239,365. Divided and this application filed May 26, 1919. Serial No. 299,906.

*To all whom it may concern:*

Be it known that I, GEORGE EDWIN RIGBY, a subject of the King of England, residing at Manchester, in the Kingdom of England, have invented new and useful Improvements Connected with Spring-Forks for Motorcycles, of which the following is a specification.

This invention relates to improvements in shock absorbing devices applicable to the spring forks at the front of motorcycles, one object being to provide a triangular fork, connected by parallel links to the opposite ends of the steering column and controlled by a laminated spring, with rigid projections, lugs, arms or side plates for holding the spring.

Further objects are to provide a centrally disposed attachment or housing integral with a crown or socket for the steering column and carrying a pivoted bracket with adjusting means for holding a single centrally situated spring; and to provide the arms or lugs of the fork with means, such as suspending links or a shackle for giving a true or real hanging position to the eye of the laminated spring.

This application is a division of my co-pending application, Serial 239,365, filed June 11, 1918.

My invention will now be fully described with reference to the accompanying drawings, in which:—

Figure 1 is a side elevation of the spring fork in connection with the steering head, all provided with my improvements; Fig. 2 is a side elevation, to a larger scale, of the attachment of the spring to the steering column; Fig. 3 is a side elevation of the bracket carrying the rear of the spring; Fig. 4 is a part sectional front elevation of the means for suspending the eye of the spring; Fig. 5 shows in front and side view the shackle for the spring.

The triangular girder fork A, of which the main bars or rear members are in close proximity to the steering head B, has, according to my invention, at the inside of each apex an integral upright lug, arm or plate C having an eye at its upper end to which is pivoted a depending shackle D. The lower part of the shackle is perforated to receive the eye of the laminated spring E. In this manner the upright rigid projections or side plates C enable the axis of suspension of the spring shackle D to be above the eye of the spring E so as to insure for the proper hanging action, while at the same time the rigid plates C prevent tilting of the shackle under abnormal stresses of the spring. The shackle D can freely oscillate between the plates C.

This is exactly the reverse to the known arrangement in which the axis of suspension of the spring is situated at the top of pivotal upright links which have their lower ends articulated to the fork and so serve as tilting props for the latter.

The steering column F carries at its lower end a crown consisting of a socket G brazed to the lower end of the steering column and the socket is coupled to the girder fork A by two lower pivoted links H, one on either side column. The socket G of the crown is integral with a central forwardly and upwardly projecting head constructed so as to form a rigid housing G* to which the thick end of the laminated spring is fixed.

The laminations of the spring E are held together by the usual tie-bolt $e$. The bracket I fits over the end $E^1$ of the spring E and is made secure thereto by a bolt $m$. The bracket is hinged or pivoted at $k$ to a housing G* and is adjustable therein by means of a set screw $d$ and a locking bolt $h$, thereby providing for the adjustment of the spring E to any weight.

The locking bolt $h$ passes transversely through curved slots $c$ in the housing G* into the bracket $l$. Said slots $c$ are concentric with the pivot $k$.

By first releasing the locking bolts $h$ and then turning the set screw $d$ one way or the other, the tension of the spring E can be varied as will be easily understood.

The adoption of a crown and central housing in lieu of a cross-head enables a single central lateral spring to be used and thereby obviates the lateral jolting due to the irregular action of the ordinary "pair" of springs.

The frame of the fork A comprises the usual rear braces, front lower and upper struts and middle stays, one on either side, which extend from about the center of the rear braces to the said lugs which carry the plates whereto the shackle with the forward end of the laminated spring is pivoted. The difference in construction existing between this girder fork and the known triangular girder fork resides more particularly in the provision of the forward three-way tubular lugs A* having an integral or rigidly fixed arm or side plate, such as C for the purpose described.

I claim:—

1. In a spring mounting for motor cycles, the combination with a rigid housing, of a head pivoted to rock therein, means for adjusting the head with respect to the housing, a spring carried by the head and a swinging shackle upon which the free end of the spring is hung.

2. In a spring mounting for motor cycles, the combination with a rigid housing, of a head pivoted to rock with respect to the housing, means for adjusting the head with respect to the housing, a laminated spring and means for clamping the butt of said spring to the head.

3. A structure as recited in claim 2, in combination with a shackle, the upper end of which is pivotally mounted and the lower end of which is pivotally connected with the outer end of the spring.

4. In a front fork mounting for motor cycles, the combination with a main frame of a front fork pivotally connected thereto for vertical movement with respect to said frame, a steering post, a housing bracket affixed to the steering post, a head carried by said housing, a spring connected to the head, a shackle pivoted at its upper end to a part of the fork and to the lower end of which the outer end of the spring is pivotally connected.

5. A structure as recited in claim 4, in combination with means for pivotally mounting the head with respect to the housing, and means for adjusting said head upon its pivot and for holding it in adjusted position.

6. A front fork mounting for motor cycles comprising in combination a main frame member, a steering post, mounted to turn therein, a fork pivotally connected to the steering post and having bodily turning movement therewith, but capable of vertical movement with respect thereto, a housing fixed to the turning post, a head pivoted in the housing for rocking movement, a laminated spring, the butt of which is secured to said head, an adjusting element for moving the head with respect to the housing, and means for connecting the outer end of said spring to a portion of the fork.

7. A structure as recited in claim 7, wherein the last-named connecting means comprises a shackle hung from a part of the fork and having the outer end of the spring pivoted thereto.

GEORGE EDWIN RIGBY.